A. G. DOUTHIT.
VEHICLE WHEEL BEARING.
APPLICATION FILED NOV. 28, 1916.

1,245,094.

Patented Oct. 30, 1917.
2 SHEETS—SHEET 1.

WITNESSES

INVENTOR
A. G. Douthit,
BY
ATTORNEY

A. G. DOUTHIT.
VEHICLE WHEEL BEARING.
APPLICATION FILED NOV. 28, 1916.
1,245,094.
Patented Oct. 30, 1917.
2 SHEETS—SHEET 2.
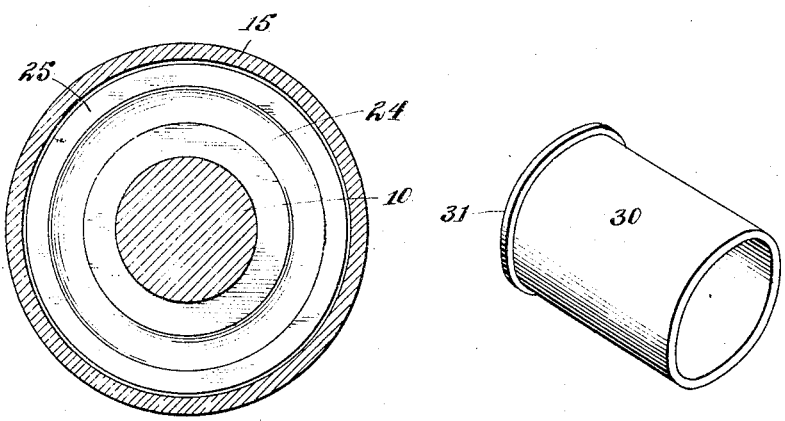
Fig. 3
Fig. 4
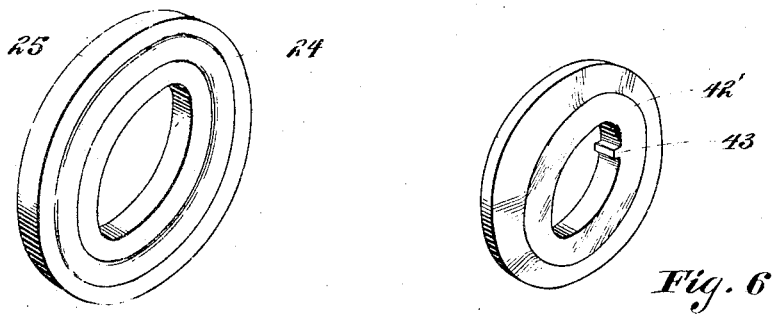
Fig. 5
Fig. 6
WITNESSES
INVENTOR
A. G. Douthit,
BY
ATTORNEY

UNITED STATES PATENT OFFICE.

ALBERT G. DOUTHIT, OF ELKHART, TEXAS.

VEHICLE-WHEEL BEARING.

1,245,094.  Specification of Letters Patent.  Patented Oct. 30, 1917.

Application filed November 28, 1916. Serial No. 133,944.

*To all whom it may concern:*

Be it known that I, ALBERT G. DOUTHIT, a citizen of the United States, residing at Elkhart, in the county of Anderson and State of Texas, have invented new and useful Improvements in Vehicle-Wheel Bearings, of which the following is a specification.

This invention relates to vehicle wheel bearings, especially adapted for use in connection with automobiles or other self propelled vehicles.

The object of the invention is to provide an economical, safe, durable, reliable and light running spindle, for use in connection with automobiles and other fast running or weight carrying vehicles.

It is also my aim to produce bearings which will reduce to a minimum friction, breakage or cutting off of the spindles in vehicles of this type.

With the above and other objects in view the invention consists of the following novel combination and arrangement of parts, to be hereinafter more fully described and illustrated in the accompanying drawings, in which:

Fig. 3 is a similar view on the line 3—3 of Fig. 1;

Figure 1:
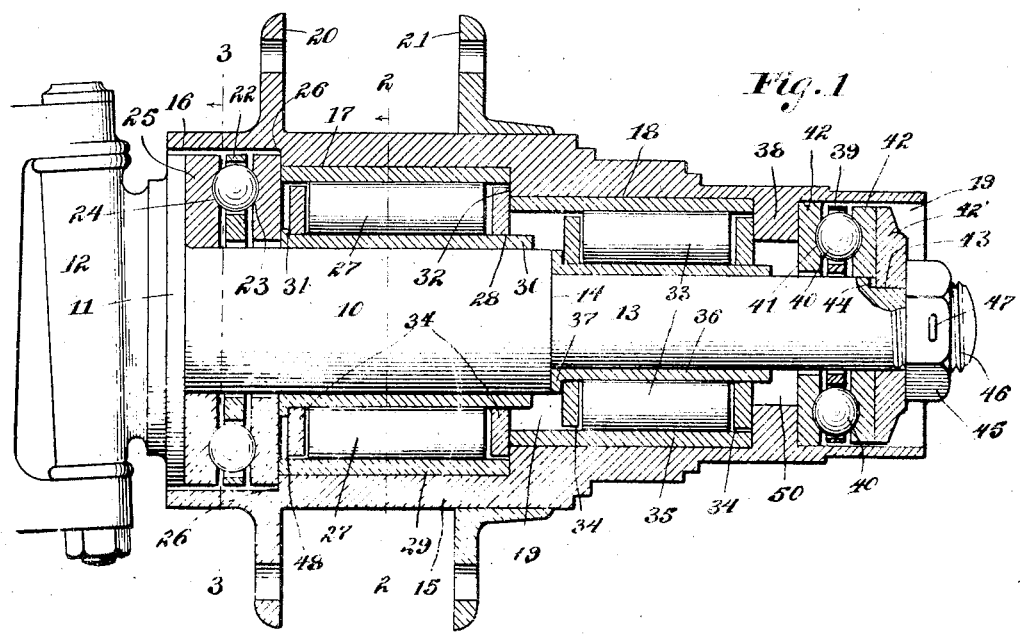
Figure 1 is a longitudinal sectional view of a vehicle wheel bearing constructed in accordance with the present invention.
Figure 2:
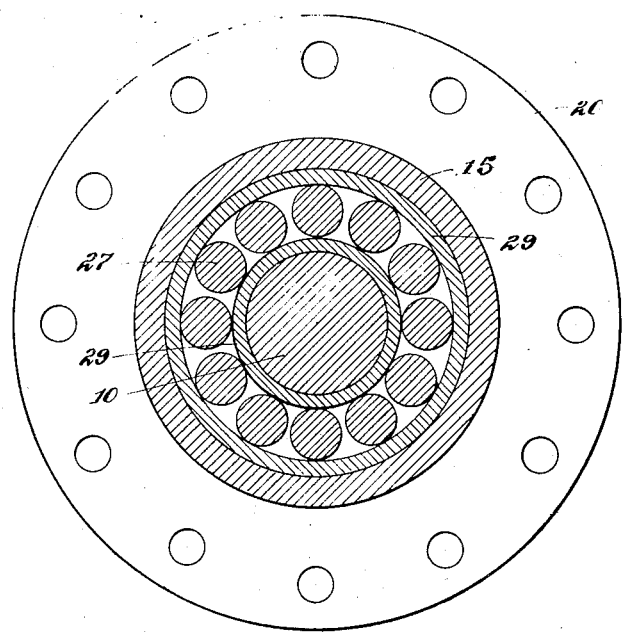
Fig. 2 is a transverse sectional view on the line 2—2 of Fig. 1.

Fig. 4 is a detail perspective view of the flange sleeve;

Fig. 5 is a similar view of one of the thrust bearing disks, illustrating the ball race way therein; and Fig. 6 is a view of the end washer.

Referring more specifically to the bearing, the numeral 10 designates the vehicle spindle designed especially to be used in connection with self propelled vehicles. The inner end of this spindle is formed with the usual end thrust flange 11, and may be provided with any suitable means for connecting with the axle of the vehicle, one means being shown at 12. The spindle is provided with a reduced portion 13, which forms a shoulder 14 at a point approximately the center thereof.

The spindle is adapted to support a hub 15 which coöperates with the spindle 10 to form chambers 16, 17, 18 and 19, for the reception of bearings hereinafter described.

Suitable spoke flanges 20 and 21 are provided upon the outer periphery of the spindle by means of which it is connected with the wheel. The chamber 16 is provided with a thrust bearing as shown, for the purpose of taking up the inner end thrust of the wheel. This bearing includes a ball retaining ring 22 adapted to hold a plurality of balls 23, the bearing surface of the said balls running in race ways 24 provided in the disks 25 mounted upon the spindle. These disks are prevented from moving longitudinally of the spindle by the flange 11 upon one side and by the shoulder 26 formed by making the chamber 17 of a lesser diameter than the chamber 16. Located within the chamber 17 are radial bearings in the form of rollers 27, the ends of which are adapted to abut against rings 28 to provide a removable guideway for said bearings. Surrounding the roller bearings 27 is an inclosing sleeve 29, and located between the bearings 27 and the spindle 10, and surrounding said spindle is a flange sleeve 30, the flange 31 of which prevents longitudinal movement of the bearing in one direction. The movement of the bearing in the opposite direction is resisted by means of the shoulder 32 formed between the chamber 17 and the reduced chamber 18. Located within the chamber 18 are roller bearings 33 similar in construction and use to the roller bearings 27, and are held in position by rings 34 in the above described manner. The sleeve 35 is similar to the sleeve 29 inclosing the bearing just described, while interposed between the bearing and the spindle is a flange sleeve 36, which has its flange 37 abutting the shoulder 14 of the spindle. The movement of the bearing in the opposite direction is prevented by means of the internal annular flange 38 which forms a partition between the chambers 18 and 19. Located in the chamber 19 is a bearing similar to the one upon the opposite end of the spindle, for the purpose of taking up the end thrust of the hub. Like the one at the opposite end of the spindle the bearing includes a ball retaining ring 39 carrying balls 40, which have their bearings in ball races 41 formed in disks 42 mounted upon the spindle. For the purpose of keeping the various parts within the hub after they are assembled, there is provided a washer 42′, which is formed with an inwardly projecting lug 43, which is received within a groove 44 upon the outer end of the spindle. This connection between the washer and spindle prevents the latter from rotating with the hub. For the purpose of holding the washer in position there is provided a nut 45 which is screwed upon the threaded end 46 of the spindle. If desired a cotter pin 47 may be utilized to hold this nut in position. The arrangement of the bearings within the various chambers is such as to provide grease pockets between each of the chambers and communicating therewith, these pockets being designated by the numerals 48, 49 and 50.

From the foregoing description and the accompanying drawings, it is thought that the operation and advantages of the invention will be apparent and that further description will be unnecessary.

Having described the invention, what is claimed, is:

A vehicle wheel comprising a spindle provided with a reduced portion to form a centrally located shoulder, a hub formed with a bore of different diameters to provide shoulders therein, flanged sleeves surrounding said spindle, retaining rings abutting the shoulders formed by the reduced diameters of the hub and the flanged sleeves to provide separate inclosed bearing chambers and rollers located within said chambers.

In testimony whereof I affix my signature.

ALBERT G. DOUTHIT.